June 4, 1946.   D. G. SMELLIE   2,401,386
MOTOR
Filed Feb. 18, 1942

INVENTOR
Donald G. Smellie
BY
Harry J. Ducarre
ATTORNEY

Patented June 4, 1946

2,401,386

UNITED STATES PATENT OFFICE 2,401,386

MOTOR

Donald G. Smellie, Canton, Ohio, assignor to The Hoover Company, North Canton, Ohio, a corporation of Ohio Application February 18, 1942, Serial No. 431,357

17 Claims. (Cl. 172—36)

This invention relates to refrigeration and more particularly to a motor fan unit for circulating the mediums in an absorption refrigerating apparatus such as shown and described in an application for Letters Patent by Charles H. MacFarland, Serial No. 317,389, filed February 5, 1940, which is now issued as Patent No. 2,271,563, dated February 3, 1942.

There are many problems peculiar to the adaptation and use of an electric motor in a three-fluid absorption refrigerating apparatus of the type shown and described in the aforementioned application for Letters Patent, which impose serious constructional and economic problems on one desiring to devise a mode of constructing such an assembly which is simple in nature, capable of being performed by ordinary skilled labor, adaptable to mass production, economical and which results in a minimum number of defective assemblies. The novel motor fan assembly with which this invention concerns itself fulfills each of the foregoing requirements to an unusually high degree as will become apparent from the present disclosure.

In the present motor fan assembly the field structure is located on the outside of the refrigerating system and the rotor on the inside. Since refrigerating systems of the absorption type must be constructed to withstand internal pressures as high as 300 pounds per square inch to provide a working factor of safety the strength of the system walls should be great at all points including the portion between the motor rotor and field. Therefore, the present invention provides a novel solution to a number of apparently irresolvable conflicting factors. For example, efficient motor design requires that the space between the rotor and the field structure be a minimum, and at the same time the application of a motor to an absorption refrigerating apparatus requires that the portion of the wall between the motor and stator be of maximum strength.

Still another example of a problem solved by this application is the following: The only material suitable for the construction of absorption refrigerating systems in large quantities is steel. This material is of course highly magnetic which is an advantageous property for the material separating the field structure from the rotor, but disadvantageous for the portion of the system walls on either side of the field structure. Thus in using steel for such purposes, its desirable magnetic property for that portion between the motor field and rotor is opposed by its undesirable magnetic property for the portions at either end of the field structure, which permits large magnetic flux leakage and consequently a great decrease in the efficiency of the motor.

More specifically the fan chamber is made of steel which is magnetic. The shell for separating the motor stator from the rotor is made as thin as possible to reduce the effective air gap between the stator and rotor and is welded to and extends from the fan chamber. If this shell is made of ordinary steel it will of course be magnetic. This magnetic property is highly suitable for the material immediately separating the stator and rotor since it will in effect form a part of the field structure and form a magnetic path from the field structure to the rotor as well as form magnetic bridges between adjacent pole tips of the field structure, which feature has been found to improve the operating characteristics of small induction motors to which this invention relates. However, this magnetic property is undesirable for the portions of the shell on either side of the field structure. That is true because this magnetic material on either side would form a magnetic path to the magnetic fan chamber and between adjacent poles of the field structure and thus materially reduce the efficiency of the motor.

That problem can be solved by making the section of the shell on either side of the field structure of a non-magnetic stainless steel such as 18-8 stainless steel which can be purchased on the open market. This steel is of high strength and is non-magnetic. Thus it is highly suitable for the portion of the shell on either side of the field structure. This usually involves the welding of the magnetic section between the field and rotor to the non-magnetic sections on either side thereof and the welding of the non-magnetic section nearest the fan chamber to the magnetic fan chamber.

In refrigerating apparatus of the type disclosed in the above-referred-to application, the power required is very small for the circulation of the mediums and it has been found that a fractional horse power induction motor is suitable for this purpose. In fact motors so small that a power input of only a few watts of electrical energy has been found to be adequate. As a consequence the motor can be made very small. In fact the entire length of the shell may be only in the neighborhood of three inches, its diameter in the neighborhood of 1¼ inches and its thickness between the rotor and stator 0.20 inch or less. Thus it can be seen that the machining tolerances are very small.

As the small parts are welded together, warpage is liable to take place even after the final machining operation is complete. If the bearings for the rotor are supported directly by this thin shell, misalignment of the bearings is liable to take place, which misalignment would eventually put the system out of operation. Since the entire refrigerating system including the motor fan unit is welded together as an integral structure, the failure of the motor fan unit due to misalignment of the bearings would necessitate the return of the entire unit to the factory for servicing, the cutting of the parts so that the motor fan unit can be repaired and the rewelding of the parts together again.

This invention relates particularly to the solution of the bearing misalignment problem of such motor fan units and provides a support for the bearings of the fan and motor rotor which is independent of the shell whereby the warpage of the shell will not affect the alignment of the bearings.

Other objects and advantages of this invention will become apparent as the description proceeds when taken in connection with the accompanying drawing in which.

Figure 1:
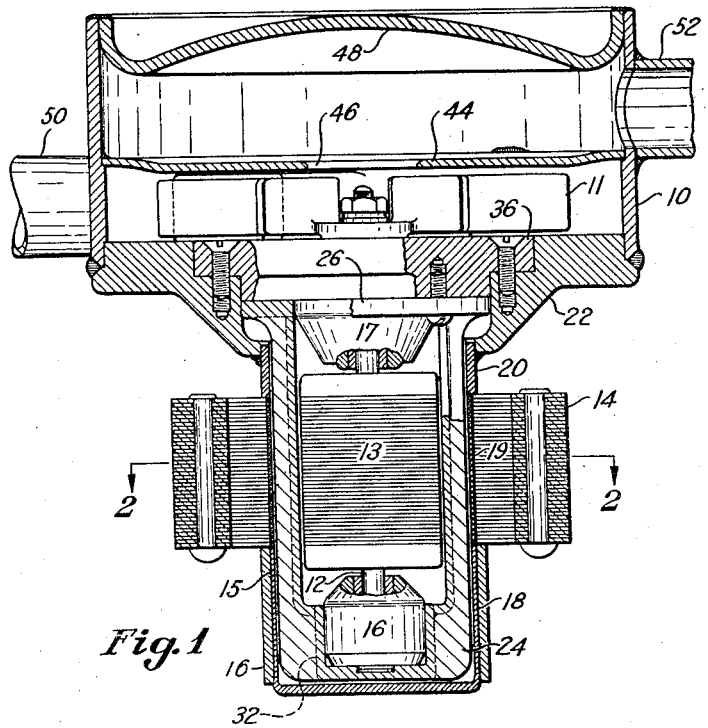
Figure 1 is a vertical sectional view of the motor fan unit according to this invention.

Referring to the drawing, the motor fan unit comprises a fan housing 10, housing an impeller fan 11 connected by a shaft 12 to a motor rotor 13. The motor rotor is separated from the field structure 14 by a thin shell 15. The fan and rotor are positioned within the shell and fan casing by a lower bearing assembly 16 and an upper bearing assembly 17 which are supported independently of the shell 15 by a yoke which will be described in more detail hereinafter. The field structure 14 is positioned on the shell 15 by means of a clamping band 16.

The shell 15 is made up of three sections, a cup-shaped end section 18, a straight annular section 19 and an annular section 20. The sections 18 and 20 are made of high strength stainless steel having non-magnetic properties. This steel is what is known as 18–8 stainless steel and is a high strength steel alloy containing 17 to 19% chromium and 7 to 9½% nickel, with a small percentage of carbon. This steel is well known in the art and is non-magnetic in that it has a high reluctance and low permeability. The section 19 is made of high strength magnetic stainless steel. One well known high strength magnetic stainless steel is a chromium iron alloy containing 16 to 18% chromium with a low percentage of carbon.

In an absorption refrigerating apparatus of the type disclosed in the above-referred-to application, the internal pressure sometimes goes beyond 300 pounds per square inch. The internal pressure being substantially equalized only a small power unit is needed to circulate the mediums in the apparatus; therefore the power input for the motor may be as low as 12 to 15 watts. It can therefore be seen that the shell 19 between the stator and rotor must have the best magnetic properties possible, combined with great strength and maximum corrosion resisting properties. The making of the portion of the shell between the rotor and stator of magnetic stainless steel reduces the effective air gap between the rotor and stator and the making of the end sections 18 and 20 of non-magnetic stainless steel prevents magnetic flux leakage from the field to other parts of the system. All three sections have high strength and good corrosion resistant properties.

The section 18 is first welded to the lower end of the section 19 and then the section 20 is welded to the upper end of the section 19. This procedure may be reversed since it is immaterial which weld is made first.

This welding may be done by any processes but preferably performed by a flash or resistance method. This method is old and well known in the art and consists briefly in bringing the abutting ends into contact and at the same time passing a welding current through them. During this period the metals are rapidly heated and a considerable portion of each is burned away. At the instant the correct welding temperature is reached the welding current is automatically shut off and the parts brought together so as to produce a bulge at the junction between the two parts. By this process the oxided metal is forced into the bulge and may later be machined off. At the same time the metals adjacent the weld are not heated up sufficiently to affect their magnetic properties.

In making the shell of high strength steel alloys and welding the sections together a leak-proof casing can be made with precision which will withstand the high pressures involved.

After the sections 18, 19 and 20 are welded together they are rough machined so as to remove the bulges caused by the welding operation and are hydraulically tested for leaks. The section 20 is then welded to the bottom 22 of a fan housing 10 by any suitable method. This forms a unitary structure consisting of the cup-shaped end section 18 of non-magnetic stainless steel, an annular section 19 of magnetic steel, a second annular section of non-magnetic steel 20, and the bottom plate 22 of the fan housing which is magnetic.

The over-all dimensions of these motor rotors insofar as the diameter is concerned is in the neighborhood of 1¼ inches and the tolerances allowed in machining are on the order of fractions of thousandths of inches. It is therefore necessary for the various parts to be assembled and machined very carefully so that the parts will be lined up properly when completed and assembled.

Figures 2, 3:
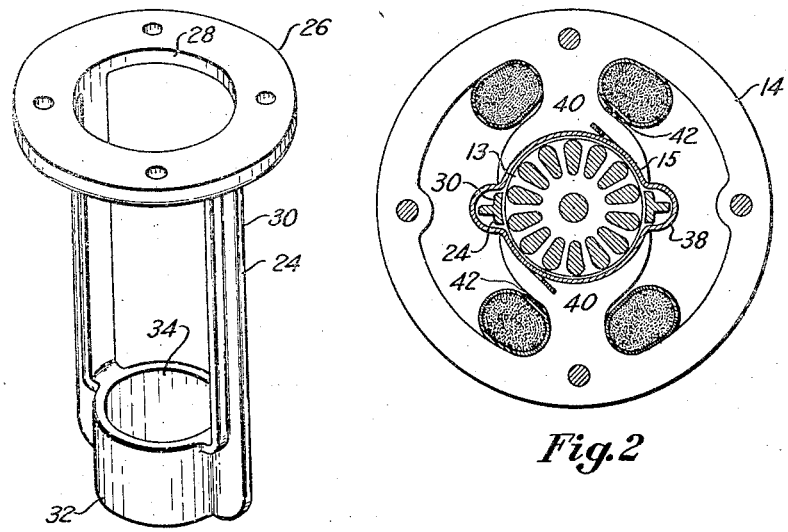
Figure 2 is a cross sectional view of the motor of Figure 1 taken on line 2—2 of Figure 1.
Figure 3 is a perspective view of the yoke for supporting the bearings from the fan chamber independently of the shell.

In order that the warpage caused by the welding together of the sections 18, 19 and 20 and the plate 22 of the motor shell and fan housing will not adversely affect the alignment of the bearing assemblies 16 and 17, a yoke generally indicated at 24 and shown in perspective in Figure 3 is provided.

The yoke 24 comprises an attaching flange 26 having a bore or bearing guide 28 which is machined accurately to size. Extending from the flange 26 are a pair of legs 30 of generally T-shape in cross section, as shown in Figure 2. At their lower ends and spaced from the flange 26 the legs 30 support a ring-like member 32 having a second bearing guide 34 therein in the form of a closed end bore which is also machined very accurately to size and in exact alignment with the bearing guide 28.

The upper bearing assembly 17 is assembled with the closure plate 36 secured to the bottom plate 22 of the fan housing 10 in any suitable manner as by screws as shown. The lower side of the plate 36 is accurately machined and supports the yoke 24 by being attached to the flange 26 by screws which pass through the flange 26 into threaded recesses in the plate 36 as shown in Figure 1. To accommodate the legs 30 the shell 15 including all three sections 18, 19 and 20 is provided with outwardly extending portions 38 which when the motor is assembled occupy a position between the poles 40 of the field structure 14. The poles 40 have shading coils 42 thereon as is well known in the art so as to produce a rotating magnetic field for starting purposes.

The fan chamber 10 is divided into suction and pressure chambers by plate 44 having an opening 46 therein opening to the suction side of the fan 11.

The sections 18, 19 and 20 are welded together as previously described and this assembly welded to the bottom plate 22 of the fan housing 10. All of the parts of the motor are then properly machined, greatest attention being paid to the size and alignment of the bearing guides 28 and 34 and the external diameters of the bearing assemblies 16 and 17. The fan chamber 10 may be welded to the plate 22 either before or after the machining operation.

The assembly comprising the sections 18, 19 and 20 and the bottom plate 22 may then be hydraulically tested for leaks up to a pressure of from 700 to 800 pounds per square inch. The bearing assembly 16 is then properly assembled into the bearing guide 34. The shaft 12 with the rotor 13 attached may then be inserted into the yoke 24 with the lower end of the shaft positioned in the bearing of the bearing assembly 16. The plate 36 with the bearing assembly 17 pre-assembled therewith may then be secured to the flange 26 by screws as shown. The upper end of the shaft 12 will thus pass through the bearing of the bearing assembly 17 and the outer accurately machined surface of the bearing assembly 17 will cooperate with the accurately machined bearing guide 28 to accurately align the bearings of the two-bearing assemblies 16 and 17. The fan 11 may then be secured to the shaft 12 by a nut as shown.

The assembly consisting of the yoke 24, rotor 13, fan 11 and the plate 36 may then be inserted into the fan chamber 10 and the shell 15 with the rotor 13 positioned opposite to the magnetic section 19 and the plate 36 secured to the plate 22 by screws as shown. The moving parts of the motor fan unit will then be properly positioned in the casing 10 and shell 15 without danger of the misalignment of the bearing assemblies 16 and 17 by a warpage of the shell 15.

Thereafter the plate 44 and the cover plate 48 may be welded to the fan chamber 10 in their proper positions. The whole assembly may then be welded to the conduits 50 and 52 as shown in Figure 1, which conduits form a part of the complete refrigerating system of the type disclosed in the aforementioned application. Prior to welding the shell 15 it may be charged with lubricant to the proper level as disclosed in the aforementioned application.

The field structure 14 is positioned tightly over the shell 15 immediately over the magnetic section 19 so as to support the shell 15 against internal pressures within the system. The magnetic section 19 beneath the poles 40 will form part of a flux path of the motor for transmitting magnetic lines of force from the field 14 to the rotor 13 and thus reduce the effective air gap. The outwardly extending portion 38 of a magnetic section 19 will form magnetic bridges between adjacent tips of the poles 40 whereby both the starting and running characteristics of the motor will be improved. The non-magnetic sections 18 and 20 will prevent magnetic flux leakage to other parts of the system as well as prevent flux leakage across adjacent poles of the field 14.

From the foregoing it can be seen that this invention provides a motor fan unit for circulating the mediums in an absorption refrigerating apparatus having a shell between the rotor and stator with a magnetic annulus immediately between the rotor and stator and non-magnetic annuli on either side thereof in which the fan and motor rotor are supported for rotation independently of the shell so that the bearing assemblies 16 and 17 cannot be forced out of alignment by warping or misalignment of the shell itself.

While I have shown and described but a single embodiment of my invention it is to be understood that this embodiment is to be taken as illustrative only and not in a limiting sense. I do not wish to be limited to the specific structure shown and described but to include all equivalent variations thereof except as limited by the scope of the claims.

I claim:

1. A motor for driving a fan for circulating the mediums in an absorption refrigerating apparatus comprising, an element forming a chamber, a shell for separating the motor rotor from the stator welded to said chamber forming element and a yoke for supporting the rotor for rotation on the interior of said shell, said yoke being supported on said chamber forming element independently of said shell.

2. A motor for driving a fan for circulating the mediums in an absorption refrigerating apparatus comprising, an element forming a chamber, a shell for separating the motor rotor from the stator welded to said chamber forming element, said shell comprising a central section of magnetic steel and end sections of non-magnetic steel, lying in end to end relationship and means for supporting the rotor on the interior of said shell independently of said shell.

3. A motor for driving a fan for circulating the mediums in an absorption refrigerating apparatus comprising, an element forming a chamber, a shell for separating the motor rotor and stator welded to said chamber forming element, said shell comprising a central magnetic section and end non-magnetic sections lying in end to end relationship and a yoke for supporting the rotor for rotation on the interior of said shell, said yoke being supporting from said chamber forming element independently of said shell.

4. A motor for driving a fan for circulating the mediums of an absorption refrigerating apparatus comprising, an element forming a chamber, a shell for separating the motor rotor from the stator welded to said chamber forming element, a yoke supported from said chamber forming element independently of said shell, said yoke having spaced guides at opposite ends thereof and bearings in said guides for supporting the rotor for rotation in said shell whereby the rotor will be supported independently of said shell.

5. A motor for driving a fan for circulating the mediums of an absorption refrigerating apparatus comprising, an element forming a chamber, a substantially cylindrical shell for separating the motor rotor from the stator secured to said chamber forming element and a yoke supported from said chamber forming element independently of and extending into said shell, said yoke comprising spaced cylindrical bearing guides connected by longitudinally extending legs, said shell having outwardly extending portions for accommodating said legs.

6. A motor for driving a fan for circulating the mediums of an absorption refrigerating apparatus comprising, an element forming a chamber, a substantially cylindrical shell secured to said chamber forming element and extending therefrom, a salient pole field structure pressed tightly over the exterior of said shell and a yoke supported upon said chamber forming element independently of and extending into said shell, said yoke comprising spaced cylindrical bearing guides connected by longitudinally extending legs, said shell having outwardly extending portions for accommodating said legs, said outwardly extending portions forming bridges between adjacent pole tips.

7. A motor for driving a fan for circulating the mediums of an absorption refrigerating apparatus comprising, an element forming a chamber, a substantially cylindrical shell secured to said chamber forming element and extending therefrom, a salient pole field structure pressed tightly over the exterior of said shell, a yoke supported from said chamber forming element independently of and extending into said shell, said yoke comprising spaced cylindrical bearing guides connected by longitudinally extending legs, said shell having outwardly extending portions for accommodating said legs, said outwardly extending portions forming bridges between adjacent pole tips and a rotor supported on the interior of said shell by said bearing guides and being positioned beneath said field structure.

8. A motor for driving a fan for circulating the mediums of an absorption refrigerating apparatus comprising, an element forming a chamber, a shell secured to and extending from said chamber forming element, said shell comprising a central annular magnetic section and end annular non-magnetic sections lying in end to end relationship, a field magnet structure on the exterior of said magnetic section, a rotatable element in said chamber forming element and a motor rotor in said shell beneath said magnetic section and means for supporting said rotatable element and rotor for rotation independently of said shell.

9. A motor for driving a fan for circulating the mediums in an absorption refrigerating apparatus comprising, an element forming a chamber, a shell secured to and extending from said chamber forming element, a yoke secured to said chamber forming element independently of and extending into said shell, said yoke having spaced bearing guides, bearings in said guides and a rotatable element supported for rotation in said bearings, said rotatable element comprising a driven element in said chamber forming element and a motor rotor in said shell between said bearing guides whereby said fan and motor rotor are supported for rotation independently of said shell.

10. An electric motor comprising, an end plate member, a shell secured to and extending from said plate member, a motor field magnet structure supported on the exterior of said shell to support said shell against high pressures on the interior of said shell, a motor rotor on the interior of said shell beneath said field magnet structure, means for supporting said rotor for rotation on the interior of said shell including a bearing at each end thereof and means extending into the interior of said shell for supporting said bearings from said end plate member independently of said shell.

11. An electric motor comprising, an end plate member, a thin annular shell welded to and extending from said plate member, said shell comprising a central magnetic annulus and end non-magnetic annuli lying in end to end relationship, a motor field magnet structure supported on the exterior of said magnetic annulus to support it against high pressures on the interior of said shell, a motor rotor on the interior of said shell at said magnetic annulus and means for supporting said motor rotor for rotation independently of said shell.

12. An electric motor comprising, an end plate member, a thin annular shell secured to and extending from said plate member, a yoke secured to said plate member independently of and extending into said shell, said yoke comprising spaced bearing guides, bearings in said guides and a motor rotor supported for rotation in said bearings on the interior of said shell whereby the motor rotor is supported independently of said shell and the bearings are not thrown out of alignment by warping of said shell.

13. An electric motor comprising, an end plate member, a thin shell secured to and extending from said plate member, a salient pole field magnet structure supported on the exterior of said shell to support it against high pressures on the interior of said shell, a yoke secured to said plate member independently of and extending into said shell, said yoke comprising spaced bearing guides connecting by longitudinally extending legs, said shell having outwardly extending portions to accommodate said legs, bearings in said bearing guides and a motor rotor supported for rotation on said bearings with the rotor proper positioned in said shell beneath said field magnet structure, said outwardly extending portions of said shell forming bridges between adjacent poles of said field structure.

14. An electric motor comprising, an end plate member, a thin annular shell secured to and extending from said plate member, said shell comprising a central magnetic annulus and end non-magnetic annuli in end to end relationship, a salient pole field magnet structure supported on the exterior of said magnetic annulus, a yoke secured to said plate member independently of and extending into said shell, said yoke comprising spaced bearing guides connected by longitudinally extending legs, said shell having outwardly extending portions for accommodating said legs, said outwardly extending portions of said magnetic annulus forming magnetic bridges between adjacent pole tips of said field structure, bearings in said guides and a rotor supported for rotation on the interior of said shell in said bearings with the rotor proper positioned at said magnetic annulus.

15. A motor for driving a fan for circulating the mediums in an absorption refrigerating apparatus comprising a chamber, a shell for separating the motor rotor from the stator welded to said chamber and means including spaced bearing guides secured to said chamber and extending into said shell for supporting a rotor for rotation on the interior of said shell independently of said shell.

16. An electric motor comprising, an end plate member, a shell secured to and extending from said plate member, a motor field structure supported on the exterior of said shell to support said shell against high pressure on the interior of said shell, a motor rotor on the interior of said shell beneath said field structure and means including spaced bearing guides extending into the interior of said shell for rotatably supporting said rotatable element from said end plate member independently of said shell.

17. A motor for driving a fan for circulating the mediums in an absorption refrigerating apparatus said motor having a rotor and a stator, comprising, a chamber, a closed bottom shell communicating at its upper end with said chamber for separating said rotor from said stator and being welded to said chamber, means for supporting said rotor for rotation on a vertical axis on the interior of said shell including a bearing at the lower end thereof and means secured to said chamber and extending into said shell for supporting said bearing independently of said shell.

DONALD G. SMELLIE.